United States Patent
Hauleitner et al.

(10) Patent No.: US 10,295,232 B2
(45) Date of Patent: *May 21, 2019

(54) COOLING SYSTEM

(71) Applicant: Aktiebolaget SKF, Gothenburg (SE)

(72) Inventors: Rudolf Hauleitner, Steyr (AT); Mario Kammerhuber, Dietach (AT); Guillermo Morales Espejel, Ijsselstein (NL); Hans Wallin, Cape Coral, FL (US)

(73) Assignee: Aktiebolaget SKF, Göteborg (SE)

( * ) Notice: Subject to any disclaimer, the term of this patent is extended or adjusted under 35 U.S.C. 154(b) by 42 days.

This patent is subject to a terminal disclaimer.

(21) Appl. No.: 15/347,470

(22) Filed: Nov. 9, 2016

(65) Prior Publication Data

US 2018/0128524 A1    May 10, 2018

(51) Int. Cl.
| | |
|---|---|
| *F25B 13/00* | (2006.01) |
| *F25B 31/00* | (2006.01) |
| *F01C 21/02* | (2006.01) |
| *F04C 29/02* | (2006.01) |
| *F16C 33/66* | (2006.01) |
| *F04C 18/16* | (2006.01) |
| *F04C 28/08* | (2006.01) |

(Continued)

(52) U.S. Cl.
CPC ............ *F25B 31/004* (2013.01); *F01C 21/02* (2013.01); *F04C 18/16* (2013.01); *F04C 29/02* (2013.01); *F16C 33/667* (2013.01); *F16C 33/6692* (2013.01); *F25B 13/00* (2013.01); *F04C 28/08* (2013.01); *F04C 2240/52* (2013.01); *F16C 19/492* (2013.01); *F16C 19/546* (2013.01); *F16C 33/303* (2013.01); *F16C 2206/60* (2013.01); *F16C 2223/14* (2013.01); *F16C 2223/16* (2013.01); *F16C 2362/52* (2013.01); *F25B 2400/07* (2013.01)

(58) Field of Classification Search
CPC ... F25B 31/002; F25B 31/004; F25B 2400/07
See application file for complete search history.

(56) References Cited

U.S. PATENT DOCUMENTS

| | | | | |
|---|---|---|---|---|
| 3,645,643 | A | * | 2/1972 | King, III ................. F01D 11/04 415/111 |
| 3,881,323 | A | * | 5/1975 | Porter ....................... C09K 5/20 62/216 |

(Continued)

OTHER PUBLICATIONS

NPL1—Mechanical engineering ‖ Why viscosity ratio should be greater then 1 for longer bearing life? ‖ Engineering Stack Exchange.*

(Continued)

*Primary Examiner* — Orlando E Aviles
*Assistant Examiner* — Antonio R Febles
(74) *Attorney, Agent, or Firm* — Mark Ussai; SKF USA Inc. Patent Dept.

(57) ABSTRACT

A cooling system includes a refrigerant compressor and a first operating medium, which includes a mixture of refrigerant and lubrication oil. An oil separator reduces the percentage of the refrigerant in the operating medium so that a second lubrication oil enriched operating medium is provided by the oil separator, the provided second operating medium having at least in a second operating state a viscosity ratio of $\kappa > 1$.

20 Claims, 4 Drawing Sheets

(51) Int. Cl.
*F16C 19/49* (2006.01)
*F16C 33/30* (2006.01)
*F16C 19/54* (2006.01)

(56) References Cited

U.S. PATENT DOCUMENTS

| | | | | |
|---|---|---|---|---|
| 4,241,591 | A * | 12/1980 | Edwards | F04C 23/003 62/402 |
| 4,275,570 | A * | 6/1981 | Szymaszek | F25B 43/02 62/468 |
| 4,770,615 | A * | 9/1988 | Fujiwara | F04C 18/16 418/15 |
| 5,469,713 | A * | 11/1995 | Wardle | F04C 29/02 62/193 |
| 6,149,311 | A * | 11/2000 | Gabelli | F16C 33/303 384/491 |
| 6,183,227 | B1 * | 2/2001 | Hida | F04C 29/026 418/201.1 |
| 7,090,404 | B2 * | 8/2006 | Morales | F16C 33/30 384/450 |
| 8,360,650 | B2 * | 1/2013 | Morales Espejel | F16C 33/6692 384/462 |
| 8,640,528 | B2 * | 2/2014 | Ganji | F16C 19/52 73/53.05 |
| 2005/0047694 | A1 * | 3/2005 | Nozaki | F16C 33/32 384/492 |

OTHER PUBLICATIONS

NPL3—Schaeffler, Lubrication of Rolling Bearings, Principles Lubrication Methods.*

NPL2—Carrier, Variable Speed Screw Compressor—Raising the Bar for Varaible Speed, Oct. 2005.*

Bearing Technologies—https://web.archive.org/web/20160322152639/ http://bearingtechnology.nl/lubrication/viscosity-ratio.*

* cited by examiner

COOLING SYSTEM

FIELD OF THE INVENTION

The present invention relates to a cooling system, and more particularly to bearings for cooling systems.

BACKGROUND OF THE INVENTION

Cooling systems are already known, for example from EP 0 664 424 A2, in which a method for lubricating bearings in refrigerant compressors is to be improved. To this end, a small amount of a refrigerant/oil mixture is introduced into the vicinity of a bearing, wherein the refrigerant is vaporized due to the bearing temperature and a lubricant including at least 75 volume percent of oil is deposited onto the bearing. Only thereby it is ensured that a sufficiently thick lubrication film is provided in the rolling contact for avoiding boundary layer lubrication with an immediate contact of the bearing components in the rolling contact. Thereby, the flow path of the refrigerant and the configuration of the bearing need to be designed such that a sufficient volume of refrigerant with at least 75% oil is deposited in all circumstances. In particular, if the refrigerant compressor has not yet reached its operating temperature, the bearing environment needs to be able to vaporize a sufficient amount of refrigerant from the refrigerant oil mixture.

Further, from EP 1 729 055 B1, lubrication systems for rolling elements in refrigerant compressors are known, in which the lubrication medium consists of an ultra-low viscous volatile fluid (ULVVF). For lubricating and guaranteeing a sufficiently thick liquid lubrication film, it is proposed to inject the liquefied fluid and to keep the fluid at least partly above the evaporating pressure by using a flow restriction. The disadvantage in this case is that, even if it has been ensured that the fluid for lubricating the rolling elements forms a liquid lubrication film and the bearing does not run dry, the bearing has to withstand extreme demands due to the poor lubrication characteristic of the fluid, which does not include lubrication oil, and therefore only high resistant and thus expensive bearings may be used in this application area.

Further, rolling element bearings are already known from EP 0 711 929 B1, in which at least one rolling element consists of a material which is harder or more rigid than the steel material of the other rolling elements, which results in a greater hardness of the at least one rolling element with respect to the other rolling elements.

BRIEF SUMMARY OF THE INVENTION

It is an object of the invention to provide a cooling system which is operated by means of a mixture of refrigerant and lubrication oil, and which is cost-effectively presentable and operates reliably in all operating states.

This object is solved by a cooling system according to claim 1.

The viscosity ratio $\kappa$ at operating temperature serves as measure for the effectiveness of the lubrication. It indicates the ratio of the actual kinematic viscosity $v$ to the kinematic viscosity $v1$, which is required for a sufficient lubrication.

Until now the general teaching has assumed so far that, at viscosity ratios of $\kappa<1$, a sufficiently sustainable hydrodynamic or elasto-hydrodynamic lubrication film cannot be established and, therefore, a boundary layer lubrication with direct touching of the bearing components in the rolling contact occurs. In contrast to that, the invention provides an oil separator which reduces the percentage of the refrigerant in the operating medium to a value for providing this operating medium for lubrication such that, in a first operating state, a viscosity ratio of $\kappa<1$ is present. The invention further provides that the operating medium provided by the oil separator has, in a second operating state, a viscosity ratio of $\kappa>1$, and serves for lubrication of a bearing site.

Here, the viscosity ratio is defined as $\kappa = v/v1$, wherein $v1$ is the nominal viscosity which indicates the required kinematic viscosity of the lubricant at operating temperatures in dependence on the average bearing diameter and the circumferential speed. It turned out that, in good approximation, the nominal viscosity for different speed ranges may be given by two equations. For rotational speeds of the bearing $n<1000$ r/min, the nominal viscosity is given as follows:

$$v1 = 45000n{-}0{,}83Dpw{-}05$$

For rotational speeds $n \geq 1000$ r/min, the nominal viscosity is given as follows:

$$v1 = 45000n{-}0{,}5Dpw{-}0{,}5$$

wherein Dpw is the pitch diameter of the roller bearing.

Further, $v$ is the actual kinematic viscosity of the lubricant at operating temperature. For values with $\kappa<1$, the actual kinematic viscosity is therefore below the nominal viscosity. For values with $\kappa>1$, the actual kinematic viscosity is therefore above the nominal viscosity. It may then be assumed that a sufficiently formed sustainable hydrodynamic lubrication film is provided.

According to the invention, a viscosity ratio of $\kappa>1$ is provided in a second operating state. First operating states may be for example operating states in which a low rotational speed is present, whereas second operating states may be indicated for example by a higher rotational speed compared to the first operating states.

According to a preferred embodiment of the refrigerant compressor, the refrigerant compressor is operated with variable rotational speeds during operation of the cooling system. Hereby, it is advantageous that the cooling system may be operated according to request so that the rotational speed of the compressor and thus the performance may be reduced during a lower performance request, leading to an energy-optimized use. As the dominant viscosity ratio of the operating medium directly depends on the rotational speed of the bearing, the viscosity ratio decreases for a decreasing rotational speed. Hence, the lubrication conditions deteriorate accordingly. More precisely, the rotor of the refrigerant compressor is operated with variable rotational speeds, and thereby also the at least one angular ball bearing supporting the rotor is operated with variable rotational speeds.

Thus, according to a preferred embodiment of the at least first angular ball bearing, the first angular ball bearing is equipped with a raceway which is particularly resistant against surface damages due to an insufficient lubrication film thickness. Thereby it is achieved that the compressor may be operated with variable rotational speed without damaging the bearing permanently due to the resulting lubrication conditions which vary in correspondence with the rotational speed. Particularly, the compressor may thereby be operated at lower rotational speeds than indicated by the nominal rotational speed.

Additionally or alternatively, first operating states may also be indicated by higher temperatures compared with second operating states. For increasing temperatures, the viscosity of an operating medium having a constant percentage of refrigerant decreases, so that the viscosity ratio decreases. On the other hand, for decreasing temperatures, the percentage of refrigerant in the operating medium may increase so that in general the viscosity decreases due to this effect. It may also be possible that for increasing temperatures the viscosity and hence the viscosity ratio increases due to the decreasing percentage of refrigerant in the operating medium at first, but decreases for further increasing temperatures due to the temperature dependency of the viscosity. Thus, the first operating states may be present in a first temperature range and the second operating states may be present in a second temperature range which differs from the first temperature range.

Thus, the viscosity ratio κ is an indirect measure of the film thickness of the lubrication film in the rolling contact between the rolling elements and the raceways of the bearing rings. The film thickness of the lubrication film is directly depending on the actual kinematic viscosity of the lubricant, which is the operating medium for lubrication. The actual kinematic viscosity is determined at atmospheric pressure. However, the viscosity of the lubricant is dependent on the pressure acting on the lubricant, wherein the viscosity increases with increasing pressure. The viscosity of the lubricant in the lubrication film in the rolling contact is therefore higher than the viscosity of the lubricant at ambient pressure. A measure for the pressure dependency of the lubricant is the pressure coefficient, which is considerably higher for a lubrication oil than for a refrigerant, approximately twice as high. Thus, the viscosity of the lubricant, which is a mixture of refrigerant and lubrication oil, in the rolling contact decreases with an increasing percentage of refrigerant in the mixture, not only due to the lower actual kinematic viscosity of the refrigerant but also due to the lower pressure coefficient of the refrigerant. The calculated viscosity ratio κ of the refrigerant oil mixture is thus not a direct proportional measure of the film thickness in the rolling contact. For the described reasons, the actual film thickness is lower than it could be assumed based on the value for κ. In other words, the film thickness of a pure lubrication oil having the same viscosity ratio as a considered refrigerant lubrication oil mixture is greater than that of the mixture. Further, the viscosity ratio, or the film thickness, respectively, depends on the rotational speed of the bearing. The lower the speed, the lower is the viscosity ratio and thus the film thickness. This is due to the fact that the nominal viscosity decreases with increasing rotational speed, as stated above.

Preferably, a second lubrication oil enriched operating medium may not only be used for lubricating the angular ball bearing but also for separately lubricating further components of the refrigerant compressor such as the rotating screw conveyors in case of a screw compressor. Thereby, the second lubrication oil enriched operating medium preferably serves for cooling and for sealing of gap tolerances of further components. An advantage of the invention is that, in contrast to conventional solutions, the demands on the oil separator for providing the second operating medium are reduced since the percentage of refrigerant in the lubricant may be substantially higher than 20% by weight. Preferably, the angular ball bearing is configured as single-row angular ball bearing which may support axial forces in one direction. Alternatively, the angular ball bearing may be configured as 4 point bearing, which may support axial forces in both directions.

According to an advantageous embodiment of the cooling system, the oil separator reduces the percentage of refrigerant in the operating medium to a value between 5% by weight and 25% by weight so that the second lubricating oil enriched operating medium has a percentage of refrigerant between 5% by weight and 25% by weight.

In a preferred cooling system, the refrigerant in the operating medium has a dynamic viscosity <1 mPas at atmospheric pressure and operating temperature. Preferred refrigerants may be for instance R134a, R1233zd, R1234ze or R1234yf. Alternatively, the refrigerant may include derivatives of alkenes. As particularly preferred derivatives, derivatives of Hydrofluoroolefins, also referred to as HFOs, or Hydrochlorofluoroolefins, also referred to as HCFOs, are provided. Also a refrigerant, which includes inter alia HFOs and HCFOs, may be employed as refrigerant. Hereby, it is advantageous that the derivatives of alkenes are particularly eco-friendly as their GWP value is lower than that of conventional refrigerants. The Global Warming Potential is referred to as GWP value, which indicates the direct contribution of the refrigerant to the greenhouse effect. However, the preferred refrigerants have a lower lubrication potential than conventional refrigerants. In addition, they are more volatile.

The advantage herein is that the oil separator does not need to be laboriously configured to maintain, in all circumstances, the percentage of the refrigerant below a certain value at which the lubrication film has a minimum thickness in the rolling contact, with which a boundary layer lubrication is reliably prevented. Thus, according to the invention, oil separators of a conventional configuration may be used.

According to a preferred embodiment of the invention, the angular ball bearing may have a characteristic value of the rotational speed of <300.000 mm/min in the first operating state. According to a further preferred embodiment of the invention, the angular ball bearing has a characteristic value of the rotational speed of >500.00 mm/min in the second operating state. Thereby it is ensured that the nominal rotational speed of the refrigerant compressor at which the greatest output is emitted and therefore also the highest demand for lubrication is present, a sufficiently developed lubrication film is provided so that a viscosity ratio of k>1 is present.

According to an inventive embodiment of the angular ball bearing, the angular ball bearing provides an inner ring, an outer ring and balls rolling therebetween, wherein the inner ring and/or the outer ring have a nitrided or carbonitrided raceway. The advantage is that the raceway has an improved surface resistance during insufficient lubrication conditions due to the nitrided or carbonitrided raceway. Thereby, the lifespan of the angular ball bearing may hereby be further increased. Alternatively, the inner ring and/or the outer ring may be case-hardened or may provide a case-hardened raceway. This may also increase the surface resistance during insufficient lubrication conditions, thereby prolonging the lifespan.

Due to the nitrated or carbonated raceways, or surfaces of the raceways, micro damages, such as micro pitting, which occur due to insufficient lubrication conditions, are reliably minimized thereby prolonging the lifespan of the bearing also during poor lubrication conditions.

According to a preferred embodiment of the invention, all balls of the angular ball bearing are made from ball bearing steel.

Hereby, it is advantageous that all balls consist of the same material and thus have the same physical characteristic such as thermal expansion. Further, if only one type of balls is used, an assembly of the angular ball bearing is not as complex as if various balls would be used per bearing. It is particularly advantageous when the inner ring and/or the outer ring are made from bearing steel. This is advantageous, as, compared to bearings, in which the rings and the rolling elements consist of ceramic or provide a ceramic surface, bearing rings made from bearing steel may be manufactured more easily and cheaper than those made from ceramic or with a ceramic raceway surface. Making the rings of the annular ball bearing from roller bearing steel has the further advantage that the bearing rings and the balls have comparable physical characteristics.

According to an alternative embodiment of the balls, at least a first ball is provided which consists at least partially of a ceramic. Hereby, the bearing becomes more resistant against deficiencies of the lubrication film for viscosity ratios κ<1, which would otherwise result in damages on the raceway. Preferably, at least the surface of the first ball consists of a ceramic. Preferably, silicon nitride Si3N4 is used. The first ball hereby provides a surface which is harder than the raceways of the inner ring and of the outer ring. Hereby, micro damages, such as micro pitting, which occur due to insufficient lubrication conditions, are partly removed by rolling the harder surface of the first ball on the raceway and the raceway is smoothed, thereby prolonging the lifespan of the bearing also during poor lubrication conditions.

According to a further alternative embodiment, all balls of the angular ball bearing are made from ceramic or have a ceramic surface. The advantage thereby is that all balls are configured as ceramic balls and therefore have the same physical characteristics such as thermal expansion. Further, if only one type of balls is used, an assembly of the angular ball bearing is not as complex as if various balls would be assembled per bearing.

According to a further advantageous embodiment of the cooling system, a joint operating medium circuit of the first and second operating medium is provided, wherein the bearing site is sealed against the first operating medium. Theoretically, it would be desirable to lubricate the bearing site of the rotor by means of a separate lubricant circuit, which is completely separated from the refrigerant circuit. However, for this purpose, complex sealing systems would be needed to permanently ensure a reliable separation of refrigerant and lubricant. As a reliable separation would be extremely complex and expensive, a joint operating medium circuit of the first and second operating medium is provided at least in a subarea, in which a mixing of the two operating mediums takes place. The oil separator according to the invention serves for separating the joint operating medium circuit into two circuits each of which having one of the two operating mediums. For reliably preventing the second operating medium to unintentionally mix with the first operating medium in the region of the bearing site, a sealing arrangement is provided. This sealing arrangement is preferably arranged between a rotor shaft of the rotor and a housing and seals the bearing site against a high pressure side of the compressor.

According to a further preferred embodiment of the raceways, the raceways are burnished. Due to the burnished layer on the raceway, the raceway provides a coating, which positively influences the running-in behavior of the bearing. Hereby, it is accepted that the burnished layer is not fatigue endurable during operation of the refrigerant compressor and is gradually consumed, however, this is of subordinate importance with respect to the positive characteristics of the running-in behavior of the bearing. In summary, with the present lubrication conditions, the lifespan of the bearing may be positively influenced, namely prolonged.

According to a preferred embodiment of the raceway, the raceway is carbonitrided, wherein preferably the surface may additionally be burnished after having been carbonitrided. Hereby, it is advantageous that the positive effects of both methods may be combined on the surfaces and hence the lifespan further increases. Further nitrided or case-hardened raceway surfaces, which are additionally burnished, have the advantage that the running-in behavior of the bearing is improved, thereby prolonging the lifespan of bearings with such raceways in inventive application areas having poor lubrication conditions.

According to an embodiment of the invention, the bearing site provides at least a second bearing, wherein the second bearing is a cylindrical roller bearing. Due to the configuration of the second bearing as cylindrical roller bearing, radial forces acting on the bearing site are supported by the cylindrical roller bearing, whereby the angular ball bearing primarily has to support axial forces. Alternatively or additionally, a further angular ball bearing or a radial ball bearing may be used. Particularly, the use of a third bearing, configured as single-row angular ball bearing, is advantageous as thereby, axial forces in both directions may be supported by the two angular ball bearings used. Alternatively or additionally, a needle bearing may be used instead of a cylindrical roller bearing for supporting radial forces.

According to a preferred embodiment of the second bearing, the second bearing provides an inner ring, an outer ring and rolling elements rolling therebetween, wherein the inner ring and/or the outer ring of the second bearing have a nitrided or carbonitrided or case-hardened raceway. According to a particularly preferred embodiment, the inner ring and/or the outer ring of the first and the second bearing provides a carbonitrided raceway.

It has been found that, in the long run, in some applications, the raceways of the first and the second bearing are differently stressed during operation. Thus in a cheap embodiment, at least one rolling element of the higher stressed first or second bearing consists of a ceramic, preferably silicon nitride Si3N4.

The invention further refers to a method for operating a cooling system, wherein the rotor of the refrigerant compressor is operated with varying rotational speeds.

BRIEF DESCRIPTION OF THE SEVERAL VIEWS OF THE DRAWING

In the following, the invention is further illustrated based on the FIGS. 1-4.

Here.

DETAILED DESCRIPTION OF THE INVENTION

Figure 1:
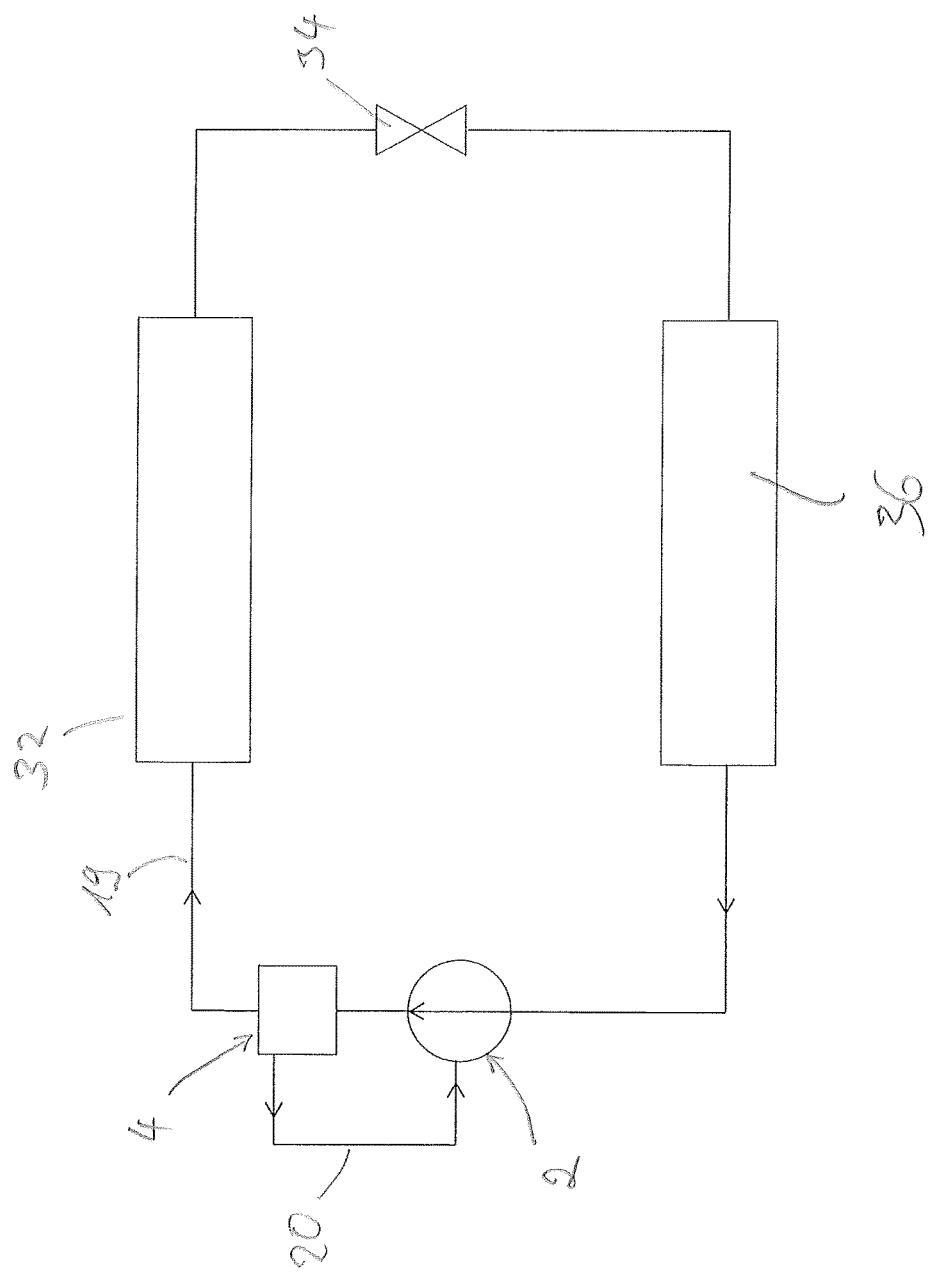
FIG. 1 shows a cooling system with a screw compressor according to the invention

In FIG. 1 an inventive first cooling system is shown which substantially provides the components refrigerant compressor 2, oil separator 4, condenser 32, expansion valve 34, vaporizer 36 and associated pipe system. A refrigerant serves R134a. In the operating medium, the refrigerant as well as a percentage of 0.5% by weight until 2% by weight of lubrication oil is provided so that the refrigerant is present as oil mixture. The compressor compresses the operating medium and supplies the operating medium to the oil separator 4. In the oil separator 4, the oil is separated from the operating medium and the operating medium circuit is split in two sub-circuits. In the first sub-circuits, which runs to the condenser 32, the percentage of the refrigerant in the operating medium is between 98% by weight and 99.5% by weight. In the second sub-circuit, which returns to the refrigerant compressor, the percentage of the refrigerant in the operating medium is between 5% by weight and 25% by weight. The oil separator thus separates the joint operating medium circuit into a first circuit and a second circuit, wherein the first circuit provides an operating medium being enriched with refrigerant and the second circuit provides an operating medium being enriched with oil compared to the first circuit. In the passage from the refrigerant compressor 2 to the oil separator 4, the first and the second operating medium are mixed and represent the joint part of the operating medium circuit. The compressed first operating medium is supplied to the condenser 32, which cools down and liquefies the first operating medium. From there, the liquid operating medium is supplied to the vaporizer 36 via the expansion valve 34, which reduces the pressure of the liquid operating medium thereby cooling down the liquid operating medium.

The now gaseous first operating medium is then supplied from the vaporizer to a suction side of the refrigerant compressor 2, which re-compresses the cold gaseous first operating medium and re-supplies it to the circuit. The second operating medium, which is separated by the oil separator, is guided to the compressor, and is from there guided to bearing sites via injection pipes so that the second operating medium forms a lubrication film between rolling elements and raceways of the bearings and thus lubricates the bearings. After passing through the bearings, the second operating medium being supplied to the bearings is returned to the suction side of the compressor via an outlet pipe. Alternatively, it may also be provided that at least a part of the second operating medium is directly returned to an input side of the oil separator via an outlet pipe. Further, a part of the second operating medium provided by the oil separator is directly supplied to the screws of the screw compressor via injection pipes for lubricating the engaging screw windings or additionally cool and seal against each other. From there, the second operating medium immediately mixes with the compressed first operating medium. The refrigerant compressor 2 may be operated with variable rotational speeds, whereby at lower rotational speeds the amount of the second operating medium provided by the oil separator 4 per time unit is lower than at higher rotational speeds. Thereby, at lower rotational speeds of the rotor 8 of the refrigerant compressor 2, not only a smaller viscosity ratio is present but also a lower volumetric lubricant flow. Depending on the performance request on the cooling system, the refrigerant compressor 2 may be operated with rotational speeds being adapted to the performance request.

Figure 2:
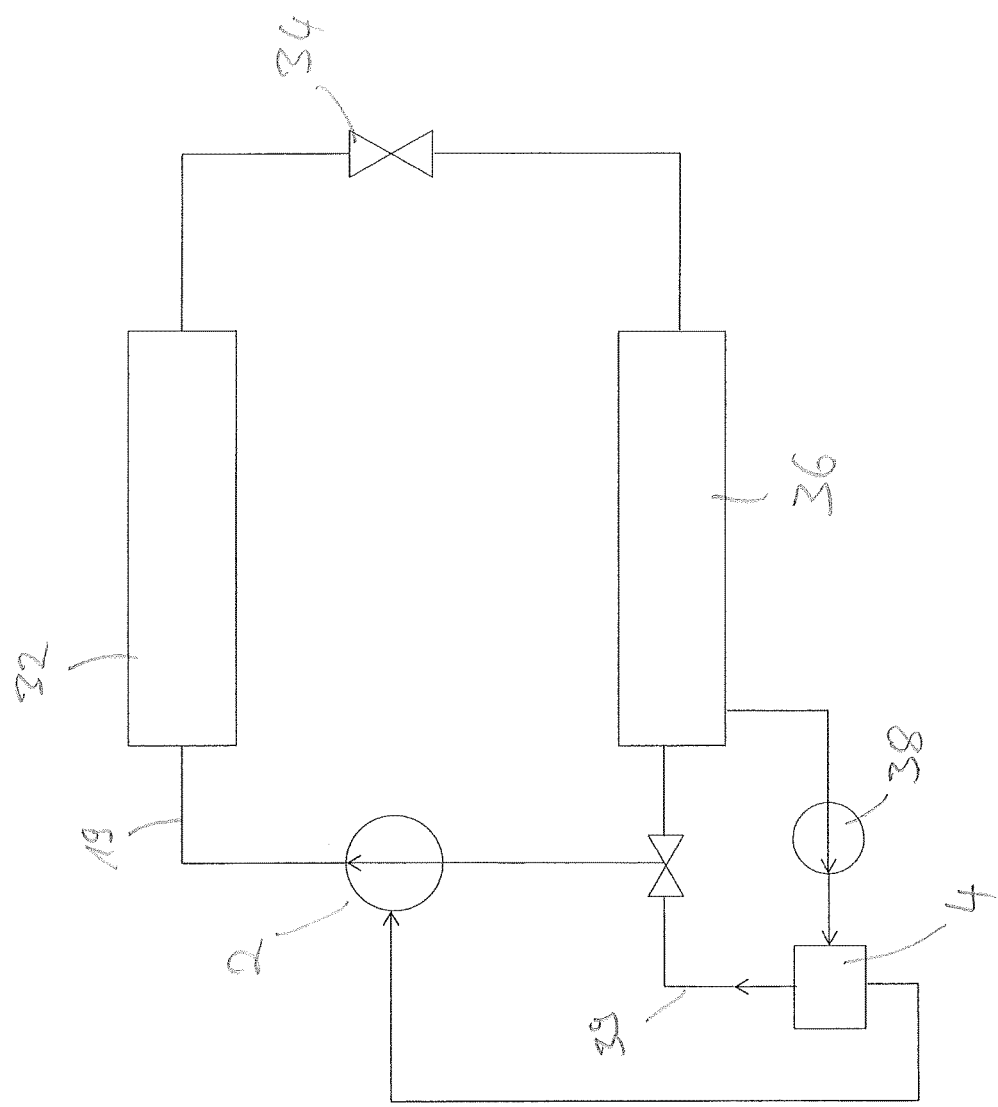
FIG. 2 shows a cooling system with a centrifugal compressor according to the invention

In FIG. 2, a second cooling system according to the invention is shown, which substantially provides the components refrigerant compressor 2, oil separator 4, condenser 32, expansion valve 34, vaporizer 36, oil pump 38 and the associated pipe system. In contrast to the refrigerant compressor of FIG. 1, the refrigerant compressor 4 of FIG. 2 is configured as centrifugal compressor and FIG. 2 represents a hydraulic schematic diagram of a cooling system with centrifugal compressor. The operating medium circuit of the first operating medium 19 is substantially identical to the one of FIG. 1 and forms a circuit over the refrigerant compressor 2, the condenser 32, the expansion valve 34, the vaporizer 36 back to the refrigerant compressor 2. In FIG. 2, the oil separator 4 is fluidly downstream of the vaporizer 36 and is pumped by means of the oil pump 38, which pumps liquid operating medium, which is located in the bottom area of the vaporizer 36, back to the oil separator 4. The oil separator 4 reduces the percentage of the refrigerant in the first operating medium to a value between 5% by weight and 25% by weight and provides this second oil enriched operating medium to an output of the oil separator 4, from where it is supplied to the refrigerant compressor 2 and from there via injection pipes to the bearing site for lubricating the bearings. After having passed the bearing site, the second operating medium is returned to the suction side of the centrifugal compressor 2. The refrigerant enriched other portion of the first operating medium, which is separated by the oil separator 4, is supplied to the suction side of the centrifugal compressor via a pipe portion 39 together with the first operating medium coming from the vaporizer 36.

Figure 3:
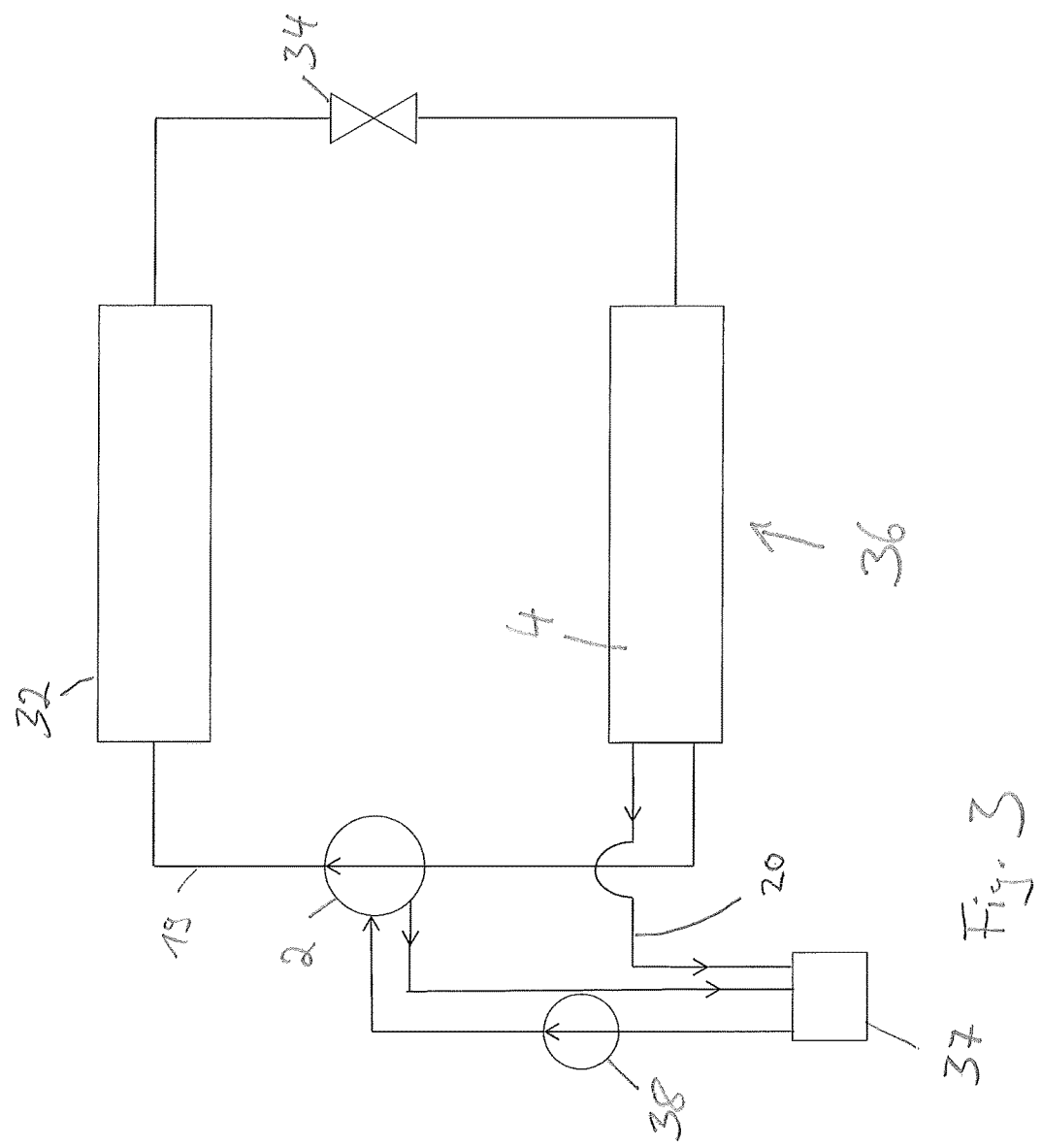
FIG. 3 shows a further cooling system with a centrifugal compressor according to the invention

In FIG. 3, a second cooling system according to the invention is shown, which substantially provides the components refrigerant compressor 2, oil separator 4, condenser 32, expansion valve 34, vaporizer 36, oil pump 38, an oil reservoir 37 and the associated pipe system. The refrigerant compressor 2 of FIG. 3 is configured as centrifugal compressor and FIG. 3 represents a further hydraulic schematic diagram of a cooling system with centrifugal compressor. The operating medium circuit of the first operating medium 19 is substantially identical to the one of FIG. 1 and forms a circuit over the refrigerant compressor 2, the condenser 32, the expansion valve 34, the vaporizer 36 back to the refrigerant compressor 2. The oil separator of FIG. 3 is not designed as separate component but is functionally integrated into the vaporizer 36. With other words, the component 36 serves as both as vaporizer and as oil separator. In the vaporizer 36, liquid oil enriched operating medium is formed in the upper part of the vaporizer, which is separated and is supplied as second operating medium to the oil reservoir 37 via a pipe. From the oil reservoir 37, the second operating medium is pumped to the refrigerant compressor 2 by means of the oil pump 38, and is supplied from there to the bearing sites via injections pipes for lubricating the bearings. After having passed through the bearings sites, the second operating medium is mostly guided back to the oil reservoir 37. However, due to leakage at seals, a minor part of the second operating medium arrives at the suction side of the centrifugal compressor 2 and, hence, is fed to the first operating medium and its operating medium circuit.

The oil separator being functionally integrated into the vaporizer reduces the amount of refrigerant in the first operating medium to a value between 5% by weight and 25% by weight, and provides the oil enriched second operating medium to the outlet of the vaporizer from where it is supplied to the oil reservoir and from there to the refrigerant compressor by means of the oil pump 38. The remaining refrigerant enriched other part of the first operating medium which is separated by the vaporizer 36 and the oil separator 4, respectively, is supplied to the suction side of the centrifugal compressor via a pipe portion.

Figure 4:
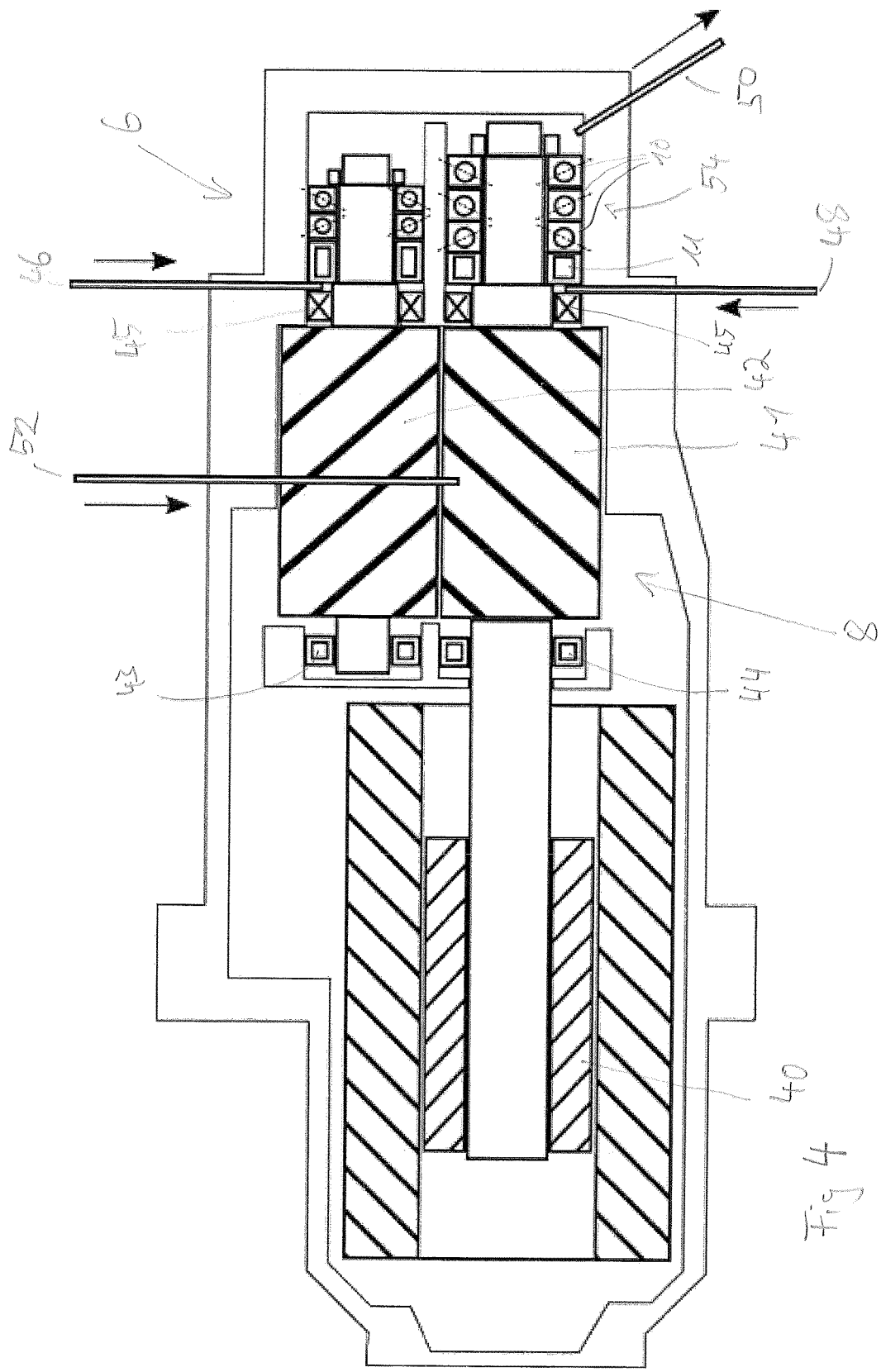
FIG. 4 shows a section through a screw compressor according to the invention

In FIG. 4, a section through the inventive refrigerant compressor 2 of FIG. 1 is shown. The refrigerant compressor 2 is configured as a screw compressor and substantially provides a drive motor 40 as well as the rotor 8, which provides two engaging screws 41 and 42. The two screws 41, 42 sit each on their own shaft, each of which is separately mounted. The rotor 8 is supported by two cylindrical roller bearings 43 and 44 at the suction side of the refrigerant compressor 2. At the pressurized side of the refrigerant compressor 2 which faces away from the motor 40, the rotor 8 is supported in the housing by the bearing site 6. The bearing site 6 is sealed to the pressurized side by a sealing arrangement 45. Via the input pipes 46 and 48, the second operating medium is introduced into the bearing site 6 between the sealing arrangement and the bearings of the bearing site 6. According to the invention, the sealing arrangement 45 is configured so that the sealing arrangement 45 is optimized regarding friction, i.e. the friction and thus the loss is minimal. However, for this, the sealing arrangement is not configured to completely seal up but allows a certain leakage of the first operating medium to pass from the pressurized side to the bearing site. In flow direction, the second operating medium passes the bearing site 6 in axial direction and exists the bearing site 6 via the outlet pipe 50 and is returned to the suction side of the compressor 2. Via a further inlet pipe 52, the second operating medium is guided to the screws 41 and 42 for lubrication. The bearing site 6 provides two bearing packages, each of which supports a shaft of the screws 41 and 42 in the housing. The first bearing package 54 provides three axially arranged angular ball bearings 10 and a cylindrical roller bearing 11. The angular ball bearings 10 and the cylindrical roller bearing 11 provide inner rings and outer rings, which are formed from roller bearing steel, wherein their raceways are carbonitrided. The first operating medium, which flows through the bearing site 6 for lubricating, provides 5% by weight to 25% by weight of refrigerant. As refrigerant a known refrigerant such as R134 a may be used. In view of performance compared to the costs, it is according to the invention in particular advantageous to use the angular ball bearings 10 and the cylindrical roller bearing 11, which are configured with carbonitrided raceways, for supporting the rotor shafts of the refrigerant compressor when using a refrigerant oil mixture, which provides between 5% by weight and 25% by weight of R134a. Thereby, oil separators of known designs may be used instead of expensive and complex oil separators, which maintain, even at reduced rotational speeds, the percentage of refrigerant in all circumstances below a certain value, at which, in the rolling contact, the lubrication film has a minimum thickness at which a boundary layer lubrication may reliably prevented. When decreasing the rotational speed, also the viscosity ratio κ decreases, resulting in deteriorated lubrication conditions. At low rotational speeds, this results in an occurrence of boundary layer lubrication at the bearing sites. At the nominal rotational speed of the refrigerant compressor, the viscosity ratio κ is over the value 1, and a sufficiently thick lubrication film is provided in the rolling contact so that at nominal rotational speed no boundary layer lubrication occurs. The use of carbonitrided bearings according to the invention may compensate this deterioration of the lubrication conditions, thereby operating the refrigerant compressor request optimized. In contrast to pure hybrid bearings, in which all of the rolling elements consist of ceramic and the bearing rings consist of roller bearing steel, or semi-hybrid bearings, in which only some of the rolling elements consist of ceramic and the bearing rings consist of roller bearing steel, carbonitrided bearings are cheaper but not so effective. However, in the claimed range of 5% by weight to 25% by weight, it has been found that the performance with respect to the required lifespan is comparable and thus, carbonitrided bearings are to be preferred, as they in addition also allow the variable operation of the refrigerant compressor.

LIST OF REFERENCE SIGNS 2 refrigerant compressor
4 oil separator
6 depository
8 rotor
10 angular ball bearing
12 inner ring of the angular ball bearing
14 outer ring of the angular ball bearing
16 balls
17 ceramic ball
18 operating medium circuit
19 first operating medium
20 second operating medium
22 second balls
24 raceway
26 second bearing
28 inner ring of the second bearing
29 outer ring of the second bearing
30 rolling elements of the second bearing
32 condenser
34 expansion valve
36 vaporizer
37 oil reservoir
38 oil pump
39 pipe portion
40 drive motor
41 screw
42 screw
43 cylindrical roller bearing
44 cylindrical roller bearing
45 seal arrangement
46 input pipe
48 input pipe
50 output pipe
52 input pipe

The invention claimed is:

1. A cooling system, comprising:
a refrigerant compressor, and
an oil separator configured to separate a combined operating medium comprising a mixture of a refrigerant and a lubrication oil into a first operating medium and a second operating medium, wherein the oil separator reduces the percentage of the refrigerant in the combined operating medium to produce the second operating medium, so that the second operating medium is lubrication oil enriched in comparison to the combined operating medium and the first operating medium,
wherein the second operating medium has a viscosity ratio of κ<1 in a first operating state of the cooling system and serves for lubricating at least one bearing site of a rotor of the refrigerant compressor,
wherein the at least one bearing site comprises at least one angular ball bearing, which comprises an inner ring, an outer ring and balls rolling therebetween, and
wherein the second operating medium has at least in a second operating state a viscosity ratio of κ>1 and serves for lubricating the at least one bearing site of the rotor.

2. The cooling system according to claim 1, wherein the oil separator reduces the percentage of the refrigerant in the combined operating medium to a value between 5% by weight and 2.5% by weight to produce the first operating medium.

3. The cooling system according to claim 1, wherein the rotor of the refrigerant compressor is configured to be operated with varying rotational speeds during operating of the cooling system.

4. The cooling system according to claim 3, wherein the angular ball bearing has a characteristic rotational speed of <300.00 mm/min in the first operating state.

5. The cooling system according to claim 4, wherein the angular ball bearing has a characteristic rotational speed of >500.00 mm/min in a second operating state.

6. The cooling system according to claim 1, wherein the inner ring and/or the outer ring have a nitrified or carbonitrided raceway.

7. The cooling system according to claim 6, wherein the inner ring and/or the outer ring have a burnished raceway.

8. The cooling system according to claim 1, wherein at least a first ball of the balls of the angular ball bearing is made from a ceramic.

9. The cooling system according to claim 8, wherein the ceramic is silicon nitride Si3N4.

10. The cooling system according to claim 1, wherein the at least one bearing site comprises at least a second bearing, wherein the second bearing is a cylindrical roller bearing.

11. The cooling system according to claim 10, wherein at least one raceway of the second bearing is carbonitrided and/or burnished and/or at least one rolling element of the second bearing is made from a ceramic.

12. The cooling system according to claim 11, wherein the ceramic is silicon nitride Si3N4.

13. The cooling system of claim 1, further comprising a condenser configured to condense the operating medium, wherein the oil separator is downstream from the condenser and upstream from the refrigerant compressor.

14. The cooling system of claim 1, wherein the oil separator is configured to decrease a refrigerant composition of the second operating medium in response to a decrease in temperature at the at least one bearing site.

15. The cooling system of claim 1, wherein the oil separator is downstream from a pressurized outlet of the refrigerant compressor, wherein the second operating medium is fed back to the refrigerant compressor from the oil separator, and wherein at least a portion of the second operating medium mixes with the first operating medium in, or upstream of a suction inlet of, the refrigerant compressor.

16. A method, comprising: separating, using an oil separator, a combined operating medium comprising refrigerant and lubrication oil, to produce a first operating medium and a second operating medium, the second operating medium that is lubrication oil enriched as compared to the first operating medium and the combined operating medium; lubricating at least one bearing site of a refrigerant compressor using the second operating medium, wherein the second operating medium in the at least one bearing site has a viscosity ratio of $\varkappa<1$ when the refrigerant compressor is in a first operating state; compressing at least the first operating medium by operating the refrigerant compressor in the first operating state; mixing the first and second operating media to produce the combined operating media; and feeding the combined operating media to the oil separator.

17. The method of claim 16, wherein separating comprises reducing a percentage of the refrigerant in the combined operating medium to a value between 5% by weight and 25% by weight to produce the first operating medium.

18. The method of claim 16, further comprising cooling the mixture of the first and second operating media in a condenser that is upstream of the oil separator and downstream from the refrigerant compressor.

19. The method of claim 16, further comprising compressing at least the first operating medium using the refrigerant compressor in a second operating state that corresponds to a higher speed, lower temperature, or both in comparison to the first operating state, wherein the second operating medium in the at least one bearing site has a viscosity ratio of $\kappa>1$ when the refrigerant compressor is in the second operating state.

20. The method of claim 16, further comprising increasing the refrigerant content of the second operating medium in response to a decrease in temperature at the at least one bearing site, to decrease the viscosity ratio of the second operating medium at the at least one bearing site.

* * * * *